(12) United States Patent
Kawabe et al.

(10) Patent No.: US 12,293,246 B2
(45) Date of Patent: May 6, 2025

(54) WIRELESS TAG READING DEVICE

(71) Applicant: TOSHIBA TEC KABUSHIKI KAISHA, Tokyo (JP)

(72) Inventors: Yuichiro Kawabe, Mishima Shizuoka (JP); Wataru Sakurai, Izu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 348 days.

(21) Appl. No.: 17/720,132

(22) Filed: Apr. 13, 2022

(65) Prior Publication Data

US 2023/0004733 A1 Jan. 5, 2023

(30) Foreign Application Priority Data

Jul. 2, 2021 (JP) ................................. 2021-110504

(51) Int. Cl.
*G06K 7/10* (2006.01)
*G07G 1/00* (2006.01)
*G07G 1/01* (2006.01)
(52) U.S. Cl.
CPC ..... *G06K 7/10079* (2013.01); *G06K 7/10297* (2013.01); *G06K 7/10316* (2013.01); *G06K 7/10415* (2013.01); *G07G 1/009* (2013.01); *G07G 1/01* (2013.01)
(58) Field of Classification Search
CPC ........... G06K 7/10079; G06K 7/10297; G06K 7/10316; G06K 7/10415; G07G 1/009; G07G 1/01; G07G 1/0018
See application file for complete search history.

(56) References Cited

U.S. PATENT DOCUMENTS 9,519,897 B2 12/2016 Terahara
11,537,804 B2 12/2022 Okayama
11,599,762 B2 3/2023 Oishi
(Continued)

FOREIGN PATENT DOCUMENTS

JP 2000091782 A 3/2000
JP 2010267010 A 11/2010
(Continued)

OTHER PUBLICATIONS

Japanese Office Action dated Feb. 25, 2025, mailed in counterpart Japanese Application No. 2021-110504, 6 pages (with translation).

*Primary Examiner* — Ryan W Sherwin
(74) *Attorney, Agent, or Firm* — Kim & Stewart LLP

(57) ABSTRACT

A wireless tag reading device has an accommodation region with a bottom surface, a first side surface, a second side surface, and a back surface. The accommodation region can accommodate therein a product with a wireless tag attached thereto. The product can be inserted and withdrawn from the accommodation region via an opening at the front and top of the accommodation region. A tag reading unit includes an antenna configured to emit radio waves toward the product in the accommodation region and then receive a response signal. The outside portions of the first side surface, the second side surface, and the back surface reflect radio waves. An inside portion of the back surface is a radio wave transmitting material. There is a gap left between the inside portion and the outside portion of the back surface portion.

18 Claims, 10 Drawing Sheets

(56) References Cited

U.S. PATENT DOCUMENTS

| | | | | |
|---|---|---|---|---|
| 2011/0133905 A1* | 6/2011 | Hussain | ................ | G16H 70/00 |
| | | | | 340/10.42 |
| 2014/0263644 A1* | 9/2014 | Handshaw | ........... | G06K 7/1096 |
| | | | | 235/440 |
| 2015/0025985 A1* | 1/2015 | Inagawa | ............. | G06F 13/4081 |
| | | | | 705/16 |
| 2019/0138772 A1* | 5/2019 | Sakurai | .............. | G06K 7/10316 |
| 2019/0272396 A1* | 9/2019 | Clouser | .............. | G06K 7/10316 |
| 2020/0242580 A1* | 7/2020 | Imamura | .............. | G06Q 20/208 |
| 2021/0165980 A1* | 6/2021 | Tsuchida | ............ | G06K 7/10297 |

FOREIGN PATENT DOCUMENTS

| | | | |
|---|---|---|---|
| JP | 2015207119 A | | 11/2015 |
| JP | 2018190255 A | | 11/2018 |
| JP | 2019139378 A | | 8/2019 |
| JP | 2020021380 A | | 2/2020 |
| JP | 2021028788 A | | 2/2021 |
| WO | 2020096034 A1 | | 5/2020 |

\* cited by examiner

A-A

WIRELESS TAG READING DEVICE

CROSS-REFERENCE TO RELATED APPLICATION

This application is based upon and claims the benefit of priority from Japanese Patent Application No. 2021-110504, filed Jul. 2, 2021, the entire contents of which are incorporated herein by reference.

FIELD

Embodiments described herein relate generally to a wireless tag reading device.

BACKGROUND

Wireless tag reading devices are in practical use these days in a variety of contexts. For example, a wireless tag in which product or merchandise code is stored can be attached to items being sold in stores such as supermarkets and large retailers. Information related to the product being purchased by a customer can be read from the wireless tag using radio frequency identification (RFID) technology or other automatic recognition technologies using short-range wireless communication.

There are certain known types of wireless tag reading devices that have a box-shaped portion with at least one open side for permitting a product or item to be placed into box-shaped portion for tag reading. With such a wireless tag reading device, the radio waves used for wireless tag reading may leak outward from the opening, and information from a wireless tag on an item still outside box-shaped portion may be inadvertently read by the reading device. One solution to such leakage may be to decrease the radio wave output strength, but this may result in a decline in overall wireless tag reading performance for items actually placed in the reading device.

In some existing reading devices, radio wave leakage reduction is achieved by installation of a radio wave absorber material or the like inside the box-shaped portion. However, such a solution tends to increase manufacturing costs.

DETAILED DESCRIPTION

At least one embodiment of the present disclosure provides a wireless tag reading device having reduced frontside radio wave leakage at low cost.

In general, according to one embodiment, a wireless tag reading device includes an accommodation region having a bottom surface portion, a first side surface portion, a second side surface portion, and a back surface portion. The accommodation region is configured to accommodate therein a product to which a wireless tag is attached. There is an opening on a front side of the accommodation region and an upper side of the accommodation region. The opening permits the product to be placed into or taken out of the accommodation region. A tag reading unit is provided including an antenna configured to emit radio waves toward the product in the accommodation region and then receive a response signal from the wireless tag of the product therein. The outside portions of the first side surface portion, the second side surface portion, and the back surface portion are a radio wave reflecting material. A bottom portion of the bottom surface portion is also a radio wave reflecting material. The inside portion of the back surface portion is a radio wave transmitting material. The inside portion and the outside portion of the back surface portion are spaced from each other leaving a gap therebetween.

Hereinafter, certain example embodiments will be described with reference to the accompanying drawings. In the example embodiments, a self-checkout device constitutes part of a self-checkout system that has a registration function and a settlement function for a product being purchased by a customer. The self-checkout device may be a product sales data device. The self-checkout system may include a server that communicates with the self-checkout device for product registration and settlement processing via network. The self-checkout device may be one example of a wireless tag reading device or may include a wireless tag reading device as one component.

(Configuration of Self-Checkout Device)

Figure 1:
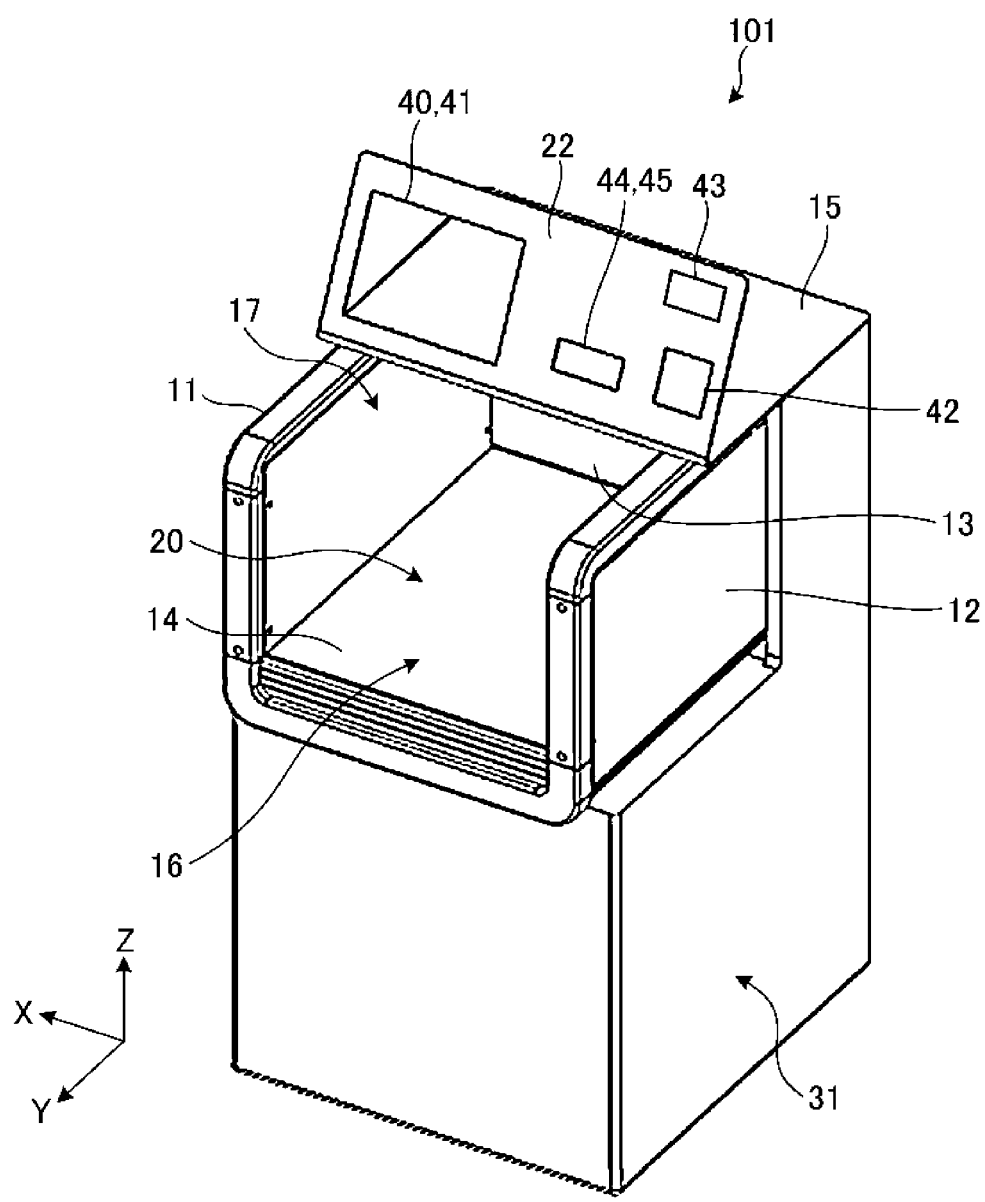
FIG. 1 depicts a self-checkout device in an external view according to an embodiment.
Figure 2A:
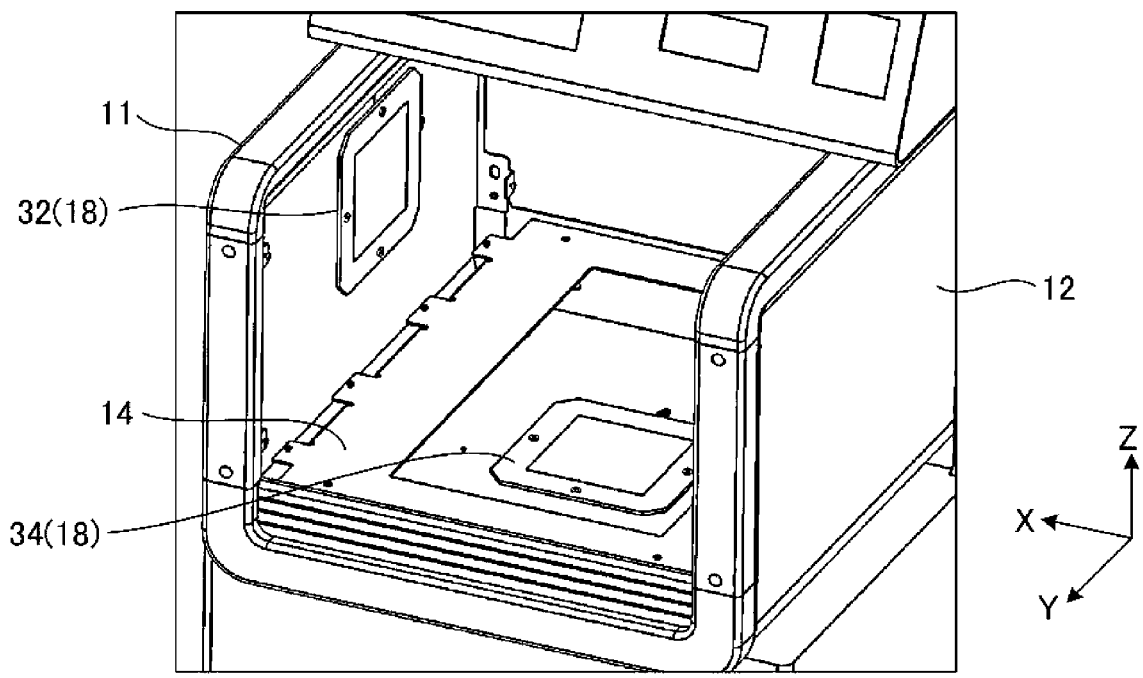
FIG. 2A depicts a tag reading unit of a self-checkout device according to an embodiment.
Figure 2B:
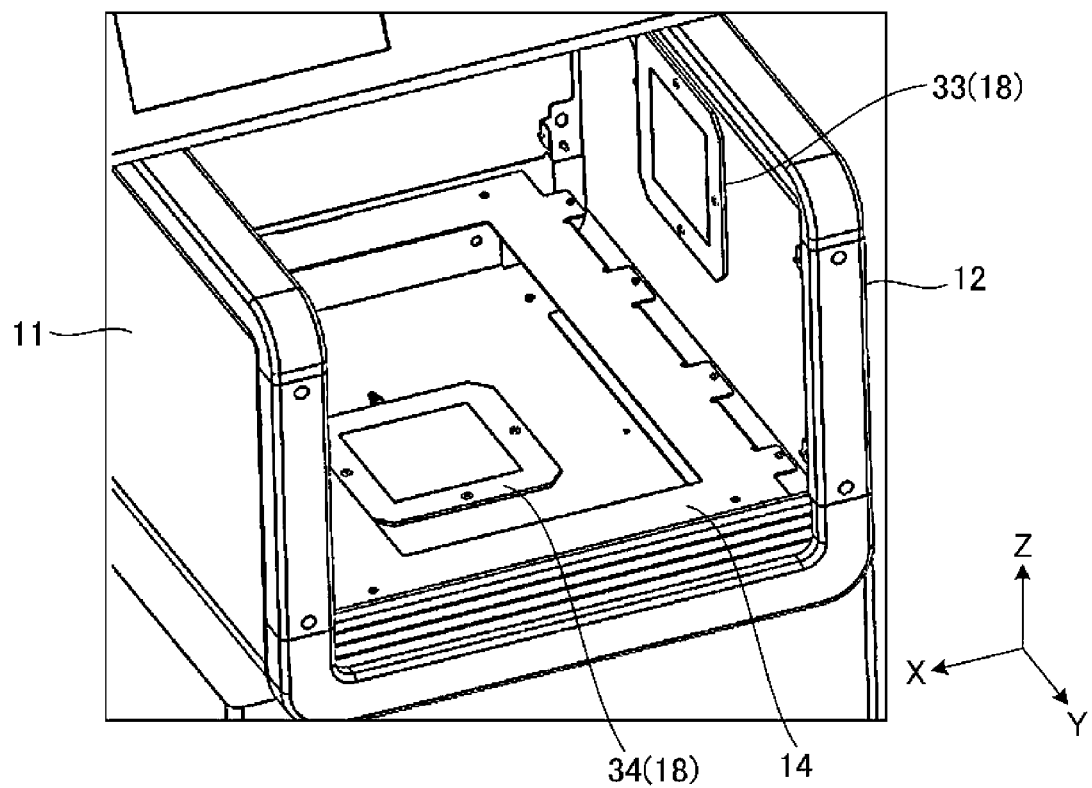
FIG. 2B depicts a tag reading unit of a self-checkout device according to an embodiment.

A self-checkout device 101 as depicted in FIGS. 1, 2A and 2B according to one embodiment is placed at, for example, a checkout counter of a store, such as a supermarket and a retail store. The self-checkout device 101 has a function of a self-point-of-sales terminal ("self-checkout POS") at which a customer performs operations related to merchandise (e.g., groceries or clothing) registration and settlement processing clothes by himself or herself. The self-checkout device 101 transmits and receives a radio wave to and from a wireless tag attached to a product to be purchased by a customer and reads a product code that is product identification information stored in the wireless tag. The self-checkout device 101 is an example of a wireless tag reading device in an embodiment.

Once the product code has been read, the self-checkout device 101 performs registration processing for registering the read product code as well as product-related information (herein also referred to as product information), such as a product name (type) and a price of the product, acquired from a memory unit based on the product code. Further, the self-checkout device 101 performs settlement processing for the registered product(s) by a method corresponding to the customer's request or designation. The settlement method is, for example, cashless settlement that uses customer's electronic money card or the like, or credit settlement that uses customer's credit card. If a customer wishes to make a cash settlement, a cash settlement terminal, which may be provided separately from the self-checkout device 101, may be used for processing a cash settlement. Alternatively, the self-checkout device 101 may also have an integrated cash settlement function that can be operated by a customer.

As illustrated in FIG. 1, the self-checkout device 101 includes a product accommodation portion 20 and a display operation panel 22 on an upper portion of a support base 31. The display operation panel 22 permits inputs of various operation instructions to the self-checkout device 101 and displays various types of information related to the operation of the self-checkout device 101.

The support base 31 has a substantially rectangular parallelepiped shape and has an outer surface surrounded by a metal plate. The support base 31 is raised in a height direction (Z-axis direction in the drawing) such that a product can be easily placed in the product accommodation portion 20 by a customer. Inside the support base 31, a space 55 (see FIGS. 3 and 4) is formed.

The product accommodation portion 20 is formed by a bottom surface 14, a left side surface 11 (positive X-axis side), a right side surface 12 (negative X-axis side) facing the left side surface 11, and a back surface 13 connecting the left side surface 11 and the right side surface 12. The product accommodation portion 20 accommodates therein a product on which a wireless tag has been attached.

The product accommodation portion 20 includes a front surface open portion 16 on a front surface side (positive Y-axis side in the drawing) and an upper surface open portion 17 on an upper surface side (positive Z-axis side in the drawing). The front surface open portion 16 and the upper surface open portion 17 permit a product to be placed in and taken out of the accommodating portion 20.

An upper surface panel 15 is installed on the back surface side (negative Y-axis negative side in the drawing) of the upper surface open portion 17. The upper surface panel 15 is formed of a radio wave-reflecting material, such as a metal. In this example, the upper surface panel 15 covers about half of the product accommodation portion 20.

The display operation panel 22 is installed at an end portion of the upper surface panel 15 on the positive Y-axis side. The display operation panel 22 includes a display device 40, a touch panel 41, a scanner 42, a card reader 43, and a receipt issuing port 44.

The display device 40 is, for example, a liquid crystal panel or an organic EL panel. The display device 40 displays information related to the operating state of the self-checkout device 101 and operation instructions.

The touch panel 41 is laminated on the display device 40 and receives operation instructions with respect to the self-checkout device 101.

The scanner 42 reads a code symbol, such as a bar code or a two-dimensional code, displayed on the display unit of a portable terminal carried by a customer. The scanner 42 performs, for example, cashless settlement authentication by reading the code symbol displayed on the portable terminal.

The card reader 43 reads information from an electronic money card or a credit card presented by a customer. The card reader 43 performs cashless settlement by reading the card information.

The receipt issuing port 44 issues a receipt showing the result of settlement performed by the self-checkout device 101. The receipt is printed by a receipt printer 45 of the self-checkout device 101 and is issued from the receipt issuing port 44.

As illustrated in FIGS. 2A and 2B, a left side surface antenna 32, a right side surface antenna 33, and a bottom surface antenna 34 are installed in the left side surface 11, the right side surface 12, and the bottom surface 14, respectively. The left side surface antenna 32, the right side surface antenna 33, and the bottom surface antenna 34 irradiate a product accommodated in the product accommodation portion 20 with a radio wave (or radio waves) and receive a response signal from the wireless tag attached to the accommodated product. These antennas 32, 33 and 34 may also be referred to as tag reading antennas.

Each antenna (32, 33, 34) may separately irradiate the product in the accommodating portion 20 and read a response signal or such irradiation and reading may be collectively performed by a combination of the antennas (32, 33, 34). The left side surface antenna 32, the right side surface antenna 33, and the bottom surface antenna 34 are each individually examples of a reading unit 18 or may be considered portions of a reading unit 18.

The antennas (32, 33, 34) emit the radio waves into the accommodation portion 20. The wireless tag on a product inside the accommodation portion 20 receives the emitted radio waves and outputs a response wave (response signal). The response wave includes information such as the product code for the product.

In some examples, only one or two of the left side surface antenna 32, the right side surface antenna 33, and the bottom surface antenna 34 may be incorporated.

The self-checkout device 101, comprises a reader unit with a left side surface 11, a right side surface 12, and a bottom surface 14. The reader unit is fitted into a housing comprising support base 31, back surface 13, upper surface panel 15, and display operation panel 22.

Figure 3:
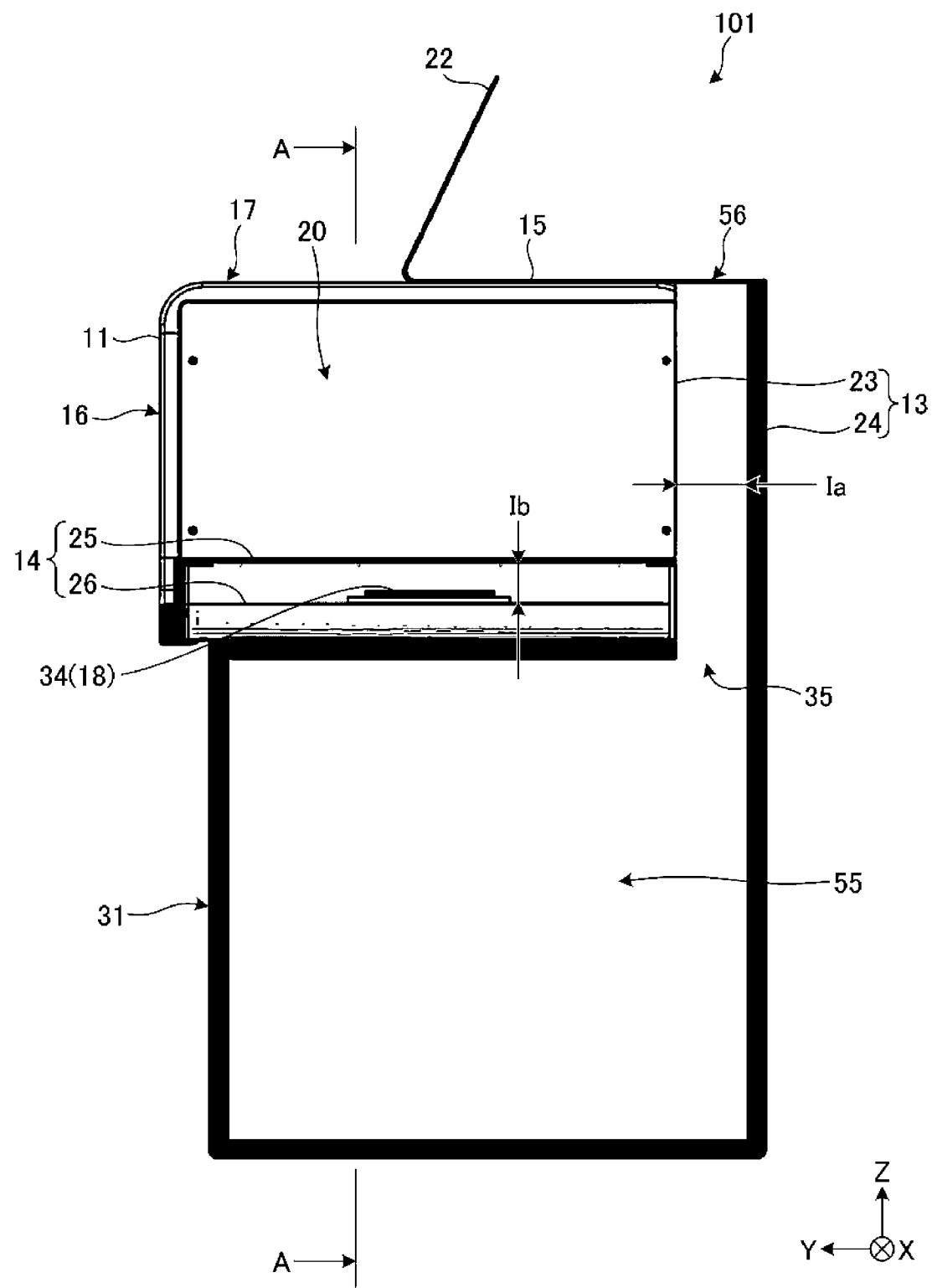
FIG. 3 depicts a self-checkout device in a YZ cross-sectional view according to an embodiment.

As illustrated in FIG. 3, the back surface 13 has an inside back surface 23, an outside back surface 24. A back surface upper partition portion 56 connects the inside back surface 23 and the outside back surface 24. The inside back surface 23 and the outside back surface 24 are substantially parallel to each other with a gap Ia (space) left therebetween. The back surface 13 may be referred to as a double-wall or double-walled structure or the like in some instances.

The inside back surface 23 is made of, for example, wood or other material that transmits (rather than blocks) radio waves. The inside back surface 23 may be referred to as a radio wave transmission portion in some instances.

The outside back surface 24 and the back surface upper partition portion 56 are made of metal or other material that substantially reflects (rather than transmits) radio waves. The outside back surface 24 can be referred to as a radio wave reflection portion in some instances.

The gap Ia between the inside back surface 23 and the outside back surface 24 is connected to the space 55 (formed in the support base 31) through a back surface lower partition portion 35.

The bottom surface 14 has an inside bottom surface 25 and an outside bottom surface 26 as illustrated in FIG. 3. The inside bottom surface 25 and the outside bottom surface 26 are substantially parallel to each other with a gap Ib (space) left therebetween. The bottom surface 14 may be referred to as a double-wall or double-walled structure or the like in some instances.

The inside bottom surface 25 is made of wood or other material that transmits radio waves. The inside bottom surface 25 may be referred to as a radio wave transmission portion in some instances.

The outside bottom surface 26 is made of a metal or other material that substantially reflects (rather than transmits) radio waves. The outside bottom surface 26 may be referred to as a radio wave reflection portion in some instances.

The bottom surface antenna 34 is installed in the space (gap Ib) between the inside bottom surface 25 and the outside bottom surface 26.

Figure 4:
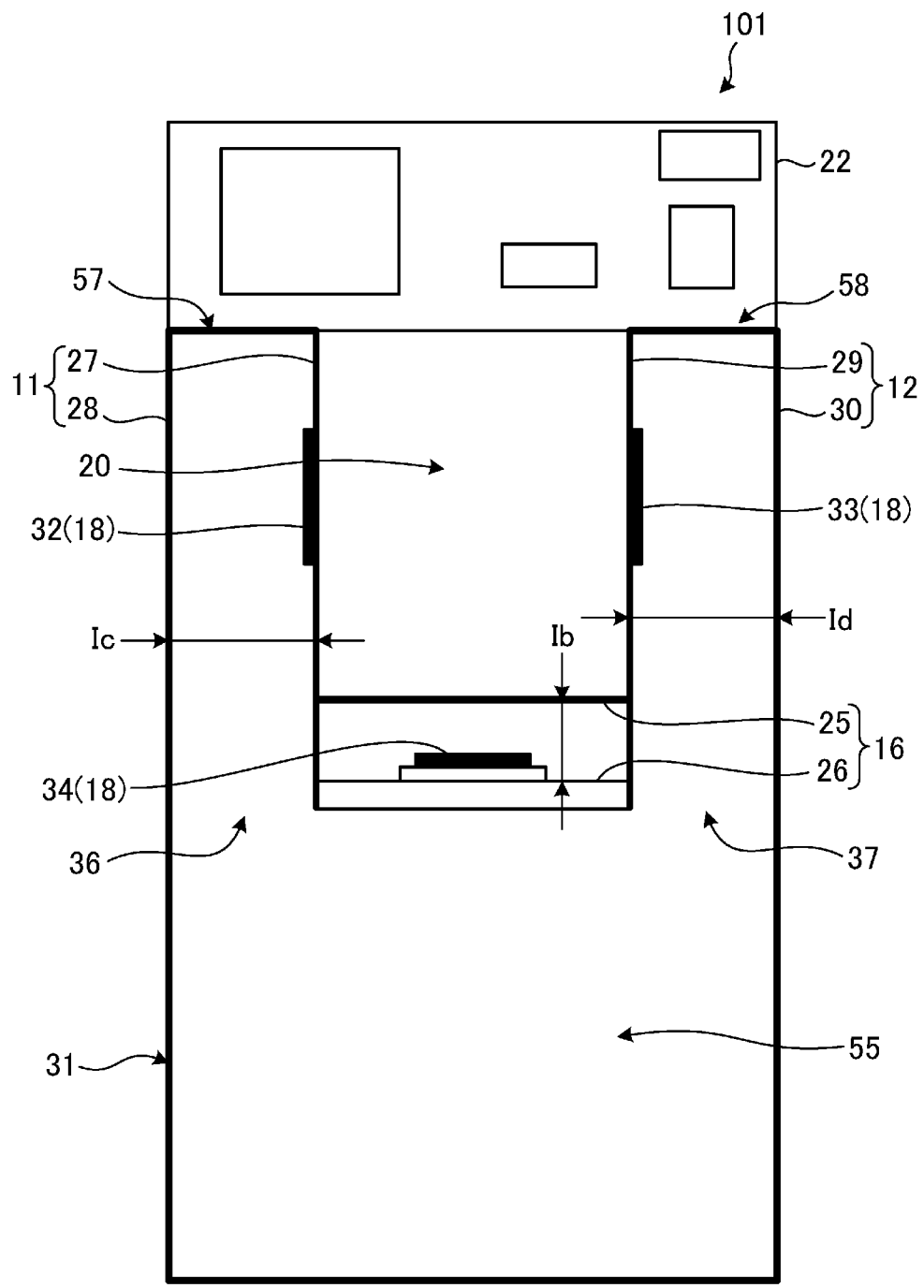
FIG. 4 depicts a self-checkout device in an XZ cross-sectional view according to an embodiment.

As illustrated in FIG. 4, the left side surface 11 has a left inner side surface 27, a left outer side surface 28, and a left side surface upper partition portion 57. The left inner side surface 27 and the left outer side surface 28 are substantially parallel to each other with a gap Ic left therebetween. The left side surface 11 may be referred to as a double-wall or double-walled structure or the like in some instances.

The left inner side surface 27 is made of wood or other material that transmits radio waves. The left inner side surface 27 may be referred to as a radio wave transmission portion in some instances.

The left outer side surface 28 and the left side surface upper partition portion 57 are made of a metal or other material that substantially reflects radio waves (rather than transmits). The left outer side surface 28 may be referred to as a radio wave reflection portion in some instances.

The gap Ic (space) between the left inner side surface 27 and the left outer side surface 28 connects to the space 55 through a left side surface lower partition portion 36.

The left side surface antenna 32 is installed in the space (gap Ic) between the left inner side surface 27 and the left outer side surface 28.

As illustrated in FIG. 4, the right side surface 12 has a right inner side surface 29, a right outer side surface 30, and a right side surface upper partition portion 58. The right inner side surface 29 and the right outer side surface 30 are substantially parallel to each other with a gap Id left therebetween. The right side surface 12 may be referred to as a double-wall or double-walled structure or the like in some instances.

The right inner side surface 29 is made of wood or other material that transmits radio waves. The right inner side surface 29 may be referred to as a radio wave transmission portion in some instances.

The right outer side surface 30 and the right side surface upper partition portion 58 are made a metal or other material that substantially reflects radio waves. The right outer side surface 30 may be referred to as a radio wave reflection portion in some instances.

The left outer side surface 28 of the left side surface 11, the right outer side surface 30 of the right side surface 12, and the outside back surface 24 of the back surface 13 may be integrally formed with one another. For example, the back surface 13 and the left and right side surfaces 11 and 12 of the self-checkout device 101 may be formed from one bent metal plate.

The gap Id (space) formed between the right inner side surface 29 and the right outer side surface 30 connects to the space 55 through a right side surface lower partition portion 37.

The right side surface antenna 33 is installed in the space (gap Id) between the right inner side surface 29 and the right outer side surface 30.

Each of the left side surface antenna 32, the right side surface antenna 33, and the bottom surface antenna 34 are installed in a position between a radio wave transmission portion and a radio wave reflection portion with the radio wave transmission portion being between the respective antenna (32, 33, 34) and the accommodation portion 20.

The gaps Ia, Ib, Ic, and Id and the thicknesses of the inside back surface 23, the inside bottom surface 25, the left inner side surface 27, and the right inner side surface 29, which are radio wave transmission portions, can be appropriately selected in accordance with, for example, a frequency or a wavelength of a radio wave to be used for wireless tag reading.

The gaps between the inside back surface 23 and the outside back surface 24 can also serve as a passageway for various devices or components installed on the display operation panel 22 and antenna harnesses, such as power and signal lines.

The self-checkout device 101 may include, on the product accommodation portion 20 side of the upper surface panel 15, an antenna (not separately illustrated) for emitting a radio wave toward the product accommodation portion 20 and reading a response wave from a wireless tag within the accommodation portion 20.

In a case where it is unlikely that there is a wireless tag above the self-checkout device 101, the back surface upper partition portion 56, the left side surface upper partition portion 57, and the right side surface upper partition portion 58 may be radio wave reflection portions, open portions, or radio wave transmission portions.

Figure 5:
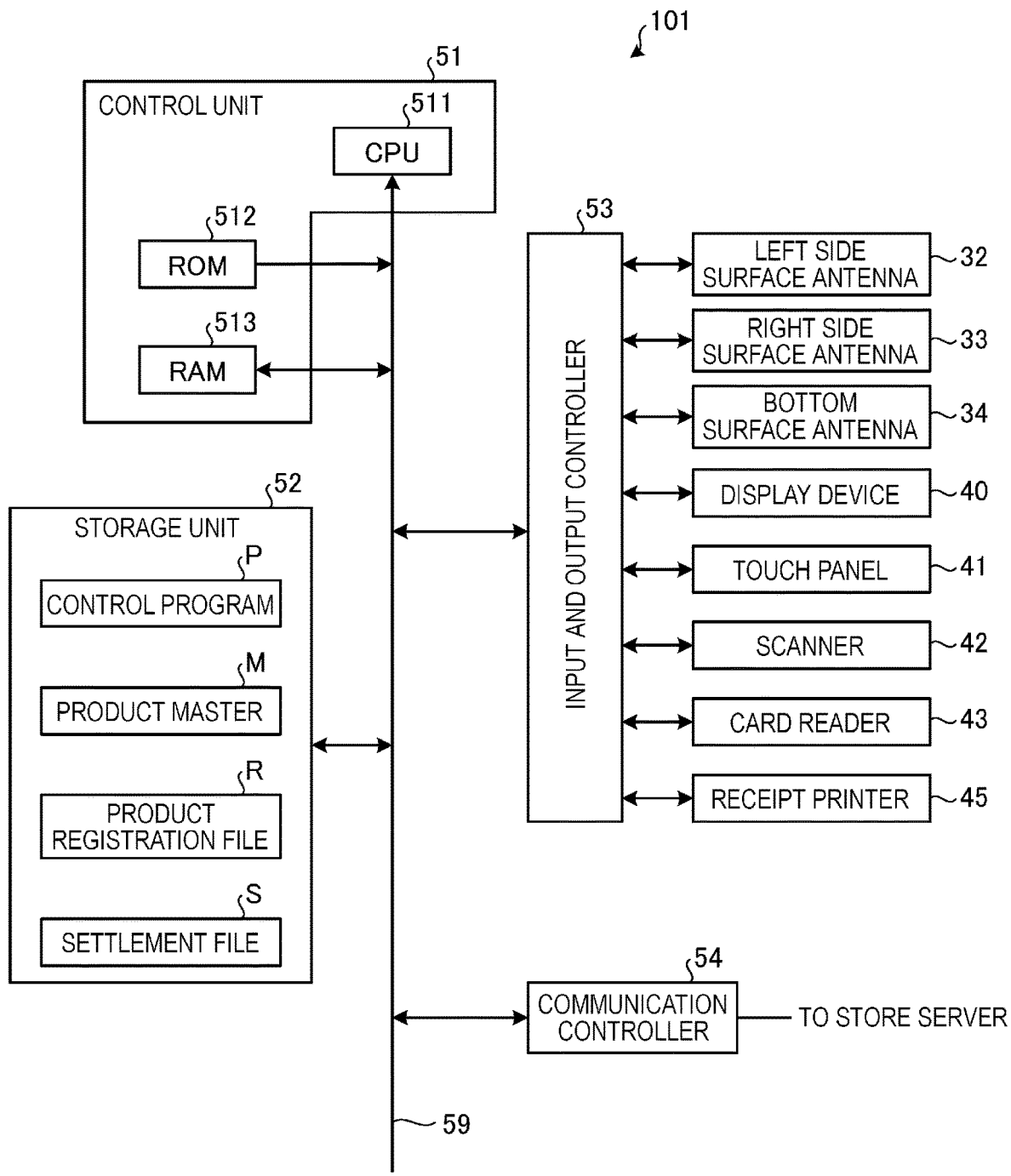
FIG. 5 is a block diagram of an example configuration of a self-checkout device according to an embodiment.

As shown in FIG. 5, the self-checkout device 101 includes a control unit 51, a storage unit 52, an input and output (I/O) controller 53, and a communication controller 54.

The control unit 51 includes a central processing unit (CPU) 511, a read-only memory (ROM) 512, and a random-access memory (RAM) 513. The CPU 511 is the control subject of the self-checkout device 101. The ROM 512 stores various types of data, various tables, and the like. The RAM 513 loads a control program and various types of data and functions as a work memory when the CPU 511 performs various types of processing.

The storage unit 52 stores a control program P, a product master M (e.g., a master file or database), a product registration file R, and a settlement file S.

The control program P is executed by the CPU 511. The CPU 511, the ROM 512, the RAM 513, and the storage unit 52 are interconnected via an internal bus 59. In the control unit 51, the CPU 511 loads the control program P into the RAM 513 from the storage unit 52 along with various types of data stored in the ROM 512. The control unit 51 executes various types of control processing related to the self-checkout device 101 based on the control program P and the various data.

The control program P may be stored in the storage unit 52 in advance or may be provided as a file recorded in a non-transitory computer-readable recording medium, such as a CD-ROM, a flexible disk (FD), a CD-R, or a digital versatile disk (DVD) in an installable or executable format. The control program P may be provided from a computer connected to a network and downloaded via the network. The control program P may instead be provided or distributed or accessed via a network, such as the Internet.

The product master M is a master file in which a product code is associated with a product and corresponding product information (for example, a product name, a product price, and a product quantity).

The product registration file R stores the product information about items registered for purchase.

The settlement file S stores results of settlement performed by the self-checkout device 101.

The input and output controller 53 connects the CPU 511 via the internal bus 59 to peripheral devices such as the left side surface antenna 32, the right side surface antenna 33, the bottom surface antenna 34, the display device 40, the touch panel 41, the scanner 42, the card reader 43, and the receipt printer 45. The input and output controller 53 controls the operation of the peripheral devices in response to instructions from the control unit 51.

The communication controller 54 controls communication between the self-checkout device 101 and a store server. The self-checkout device 101 receives an updated version of the product master M from the store server from time to time. The self-checkout device 101 transmits, for example, the product registration file R and the settlement file S to the store server from time to time.

The communication controller 54 also communicates with a server device of an electronic money management company or a credit card management company if a customer uses the card reader 43 to read an electronic money card or a credit card. The communication controller 54 communicates with a server device of a cashless settlement management company if a customer causes the scanner 42 to read a code symbol.

Figure 6:
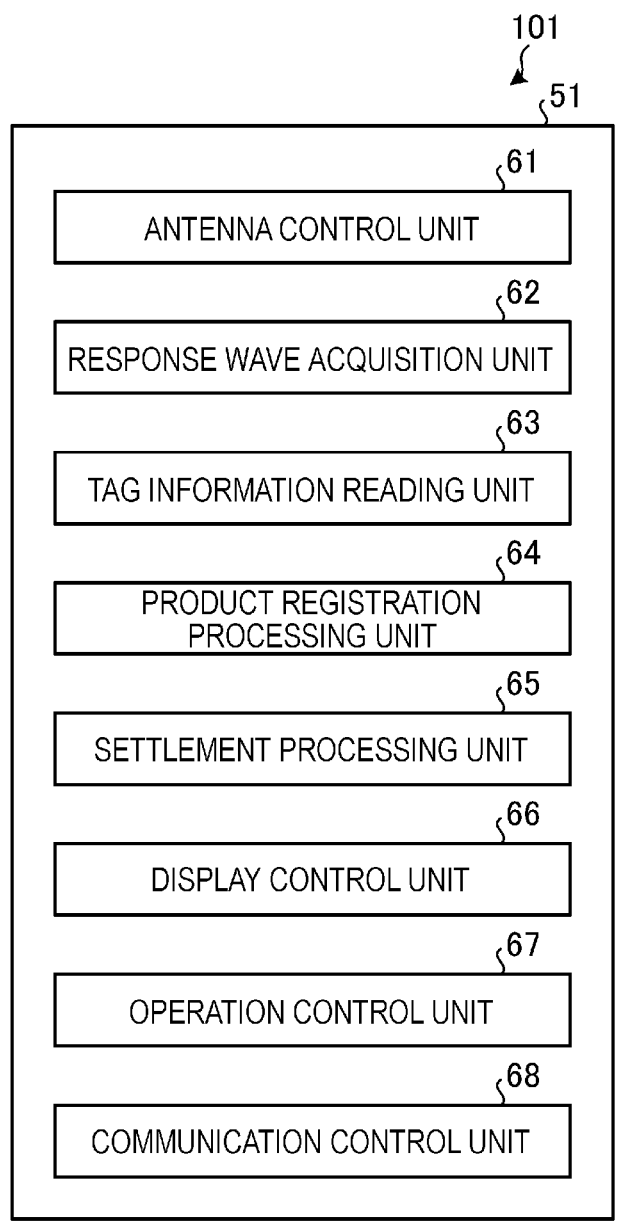
FIG. 6 is a block diagram of an example configuration of a self-checkout device according to an embodiment.

The control unit 51 of the self-checkout device 101 loads the control program P into the RAM 513 and executes the control program P. As a result, the control unit 51 of the self-checkout device 101 realizes the functions of an antenna control unit 61, a response wave acquisition unit 62, a tag information reading unit 63, a product registration processing unit 64, a settlement processing unit 65, a display control unit 66, an operation control unit 67, and a communication control unit 68, which are illustrated in FIG. 6.

The antenna control unit 61 causes radio waves for reading tag information to be emitted from the left side surface antenna 32, the right side surface antenna 33, and the bottom surface antenna 34. After the reading of the tag information is completed, the antenna control unit 61 controls the left side surface antenna 32, the right side surface antenna 33, and the bottom surface antenna 34 to stop the radio wave emission. In this example, the antenna control unit 61 performs the same control on the left side surface antenna 32, the right side surface antenna 33, and the bottom surface antenna 34. The antennas (32, 33, 34) may be operated at the same time or may be operated in a time division manner.

The response wave acquisition unit 62 acquires response waves received by the left side surface antenna 32, the right side surface antenna 33, or the bottom surface antenna 34.

The tag information reading unit 63 reads the tag information from the response wave acquired by the response wave acquisition unit 62. For example, the tag information reading unit 63 analyzes the acquired response wave to read (decode) information indicating the product code in the response wave.

The product registration processing unit 64 identifies the corresponding product information (e.g., product name, product price, and so on) by comparing the product code acquired by the tag information reading unit 63 to information stored in the product master M. Then, the product registration processing unit 64 registers the corresponding product information in the product registration file R.

The settlement processing unit 65 performs settlement processing on the registered products using a settlement method designated by the customer based on registered information in the product registration file R.

The display control unit 66 controls the display state of the display device 40.

The operation control unit 67 detects the operation state of the touch panel 41 and transmits the detected operation information to the control unit 51.

The communication control unit 68 interconnects the control unit 51 and a store server or an external server device via the internal bus 59 by wired communication or wireless communication.

(Behavior of Emitted Radio Wave)

Figure 7:
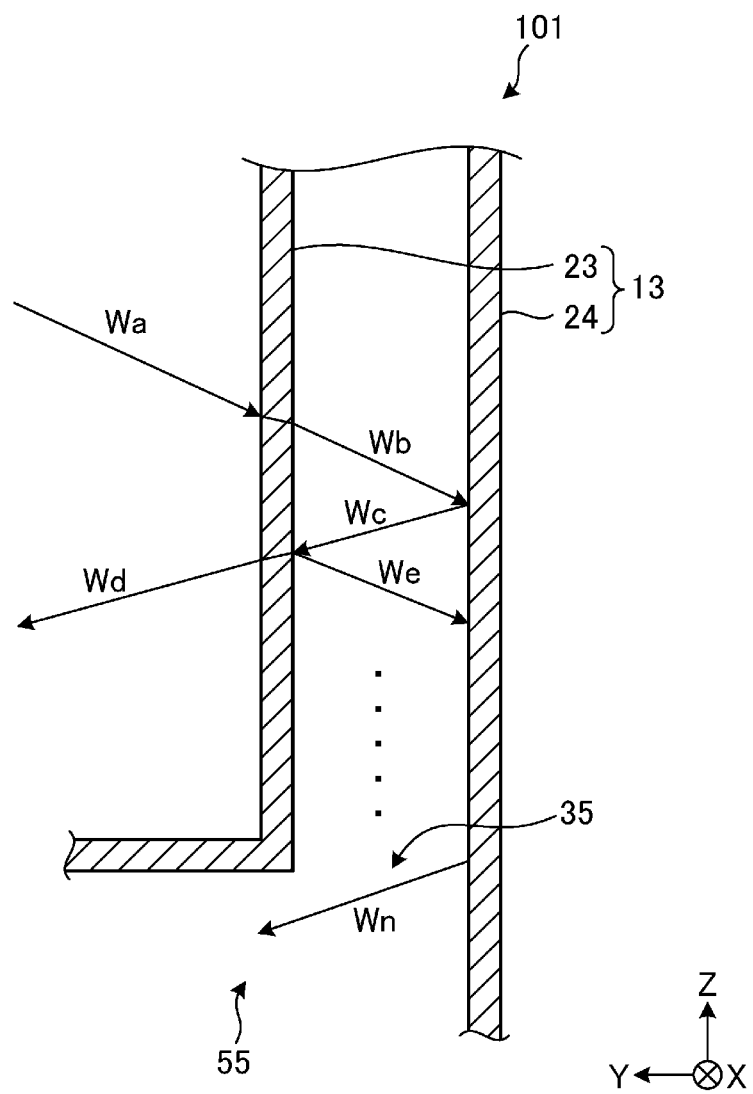
FIG. 7 depicts a behavior of a radio wave reaching a back surface of a self-checkout device according to an embodiment.

The behavior of emitted radio waves reaching the back surface 13 will be described with reference to FIG. 7. FIG. 7 is a diagram illustrating the behavior of a radio wave reaching the back surface of the self-checkout device 101.

It is assumed in the depiction of FIG. 7 that the radio wave Wa first reaches the inside back surface 23. This radio wave Wa may have been emitted from the left side surface antenna 32, the right side surface antenna 33, or the bottom surface antenna 34. The radio wave Wa then passes through the inside back surface 23 and now is designated as radio wave Wb through the gap region between the inside back surface 23 and the outside back surface 24. The radio wave Wb reaches the outside back surface 24 and, reflects back towards the inside back surface 23. The reflected radio wave Wb travels as radio Wc in the gap region back towards the inside back surface 23 in the Y-axis positive direction. Once the radio wave Wc reaches the inside back surface 23, part of the radio wave Wc transmits through the inside back surface 23 as radio wave Wd and returns to the product accommodation portion 20. Another part of radio wave Wc reflects off the inside back surface 23 as radio wave We which heads back toward the outside back surface 24. Subsequently, the radio wave repeats the same behavior multiple (n) times between the inside back surface 23 and the outside back surface 24 and ultimately reaches the back surface lower partition portion 35 as radio wave Wn. After reaching the back surface lower partition portion 35, radio wave Wn enters the space 55 formed in the support base 31. The inner portion of the space 55 is covered with, a radio wave reflecting member or material, such as metal, and thus the radio wave Wn repeatedly reflects inside the space 55 and gradually attenuates.

In this manner, part of the radio wave incident on the inside back surface 23 from the product accommodation portion 20 enters the space 55 as a result of repeated reflection in the gap between the inside back surface 23 and the outside back surface 24. Accordingly, the intensity of the radio wave returning from the back surface 13 toward the front surface open portion 16 is less than that of the radio wave initially reaching the back surface 13 (inside back surface 23).

In addition, as illustrated in FIG. 4, the gap Ic is formed between the left inner side surface 27 and the left outer side surface 28 of the left side surface 11, and the gap Id is formed between the right inner side surface 29 and the right outer side surface 30 of the right side surface 12. Accordingly, both a radio wave incident on the left inner side surface 27 and a radio wave incident on the right inner side surface 29 exhibit the same or substantially the same behavior as that of the radio wave depicted in FIG. 7. The intensity of the radio wave returning from the left side surface 11 toward the product accommodation portion 20 is less than that of the radio wave initially reaching the left side surface 11. The intensity of the radio wave returning from the right side surface 12 toward the product accommodation portion 20 is less than that of the radio wave initially reaching the right side surface 12.

(Behavior of Reflected Radio Waves Resulting from Difference in Back Surface Structure)

Figure 8:
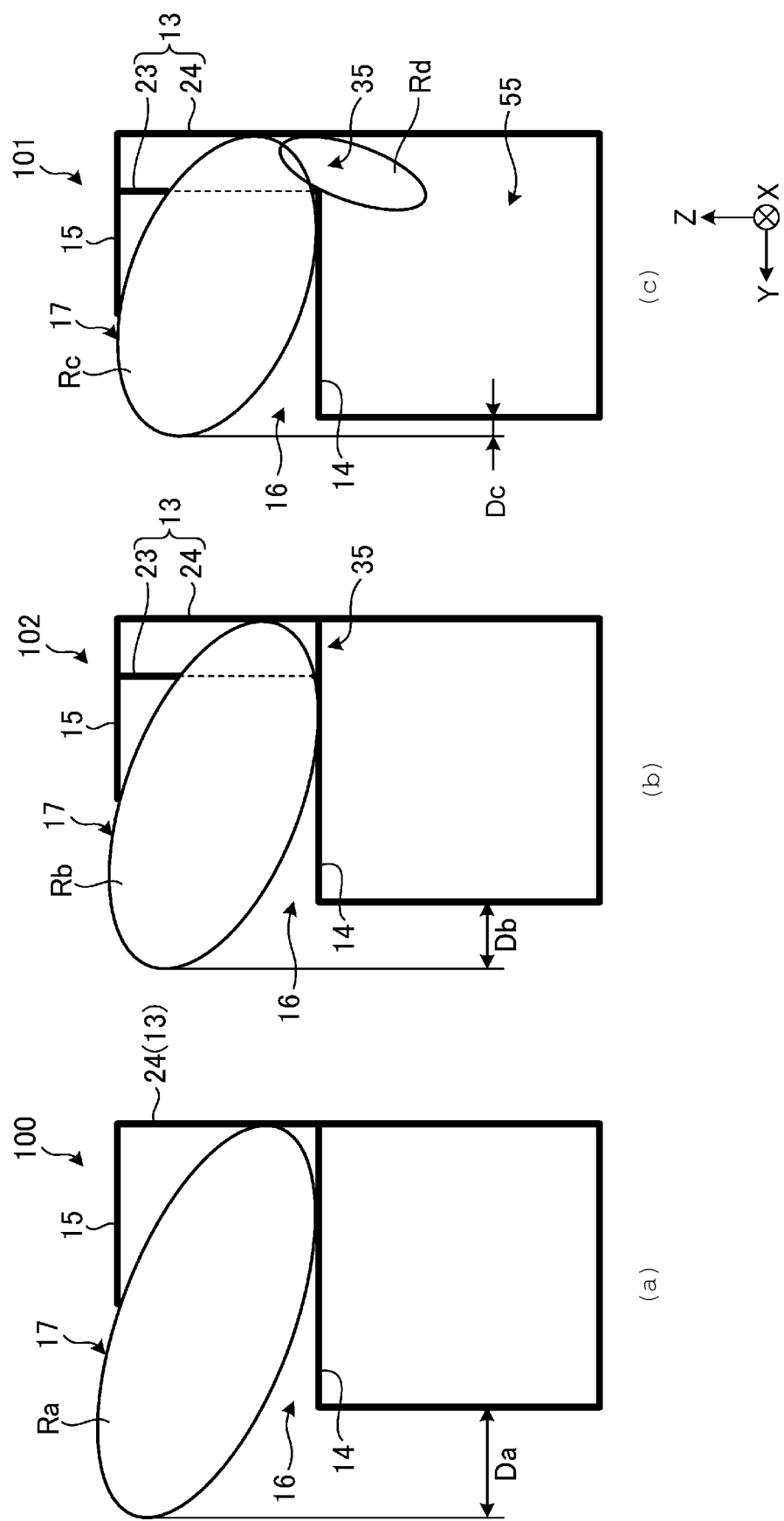
FIG. 8 is a conceptual diagram illustrating aspects related to the intensity of reflected radio waves and back surface structures.

A difference in behavior of a reflected radio wave resulting from a difference in structure of the back surface 13 will be described with reference to FIG. 8. FIG. 8 is a conceptual diagram illustrating differences in the intensity of the reflected waves from different examples of the back surface structure of a self-checkout device.

A self-checkout device 100 illustrated in FIG. 8, part (a) is a comparative example. In the self-checkout device 100, only one radio wave-reflecting outside back surface 24 forms the back surface 13 and there is no double-wall structure (e.g., no inside back surface 23).

In the self-checkout device 100, a radio wave incident on the back surface 13 reflects off the outside back surface 24 and generates a reflected wave Ra. The reflected wave Ra is emitted to the front surface side (that is a customer side) of the self-checkout device 100 from the front surface open portion 16 and the upper surface open portion 17 between the upper surface panel 15 and the bottom surface 14. The reflected wave Ra has a reflection intensity Da. The reflection intensity Da of the reflected wave Ra is schematically represented in FIG. 8 by the distance by which reflected wave Ra protrudes beyond the front surface opening portion 16. Reflection intensity db and Dc are similarly represented in the same manner.

A self-checkout device 102 illustrated in FIG. 8, part (b) is a modification self-checkout device 101. In the self-checkout device 102, while the back surface 13 is formed as double-wall structure including the radio wave-transmitting inside back surface 23 and the radio wave-reflecting outside back surface 24 with a gap therebetween in a similar manner to that of the self-checkout service 101, the back surface lower partition portion 35 is blocked by the radio wave-reflecting bottom surface 14 rather than being an opening/passageway.

In the self-checkout device 102, a radio wave incident on the back surface 13 passes through the inside back surface 23 and reaches the outside back surface 24. Then, the radio wave reflects off the outside back surface 24 and heads back toward the inside back surface 23. Once the radio wave reaches the inside back surface 23, part of the radio wave passes through the inside back surface 23 and travels to the front surface side of the self-checkout device 102. The rest of the radio wave that has reached the inside back surface 23 heads back toward the outside back surface 24 due to another reflection off the inside back surface 23.

In this manner, the part of the radio wave incident on the back surface 13 repeatedly reflects in the gap between the inside back surface 23 and the outside back surface 24, traveling towards the back surface lower partition portion 35. Then, the radio wave reflects off the back surface lower partition portion 35, travels back in the gap and gradually attenuates due to the repeated reflection. Consequently, the intensity of the radio wave returning from the back surface 13 becomes less than that of the radio wave initially incident on the back surface 13. Thus, with self-checkout device 102, the reflected wave Rb has a reflection intensity db that is less than occurs with self-checkout device 100. The magnitude of the reflection intensities has the relationship Da>db.

In the self-checkout device 101 as illustrated in FIG. 8, part (c), the back surface 13 is formed as double-wall structure including the radio wave-transmitting inside back surface 23 and the radio wave-reflecting outside back surface 24 with the gap therebetween (see also FIG. 7). The back surface lower partition portion 35 is open and communicates with the space 55.

In the self-checkout device 101, the behavior of a radio wave incident on the back surface 13 is as described above (see FIG. 7). As depicted in FIG. 8, part (c) the reflected wave Rc having a reflection intensity Dc returns from the back surface 13. A reflected wave Rd is passes through the back surface lower partition portion 35 toward the space 55. The relationship of magnitude of the reflection intensity among the self-checkout devices 100, 101, and 102 is Da>db>Dc.

In the self-checkout devices 101 and 102, the same or substantially the same effects can be obtained by installing a radio wave-transmitting member, such as wood, in the back surface lower partition portion 35 rather than having an open space.

In addition, in the self-checkout devices 101 and 102, the intensity of the radio waves leaking to the outside may be further reduced by installing a radio wave absorber material on the bottom surface 14 (inside bottom surface 25), the upper surface panel 15, and/or end portion regions of the left side surface 11 (left inner side surface 27) and the right side surface 12 (right inner side surface 29) on the positive Y-axis side illustrated in FIG. 4.

(Flow of Processing Performed by Self-Checkout Device)

Figure 9:
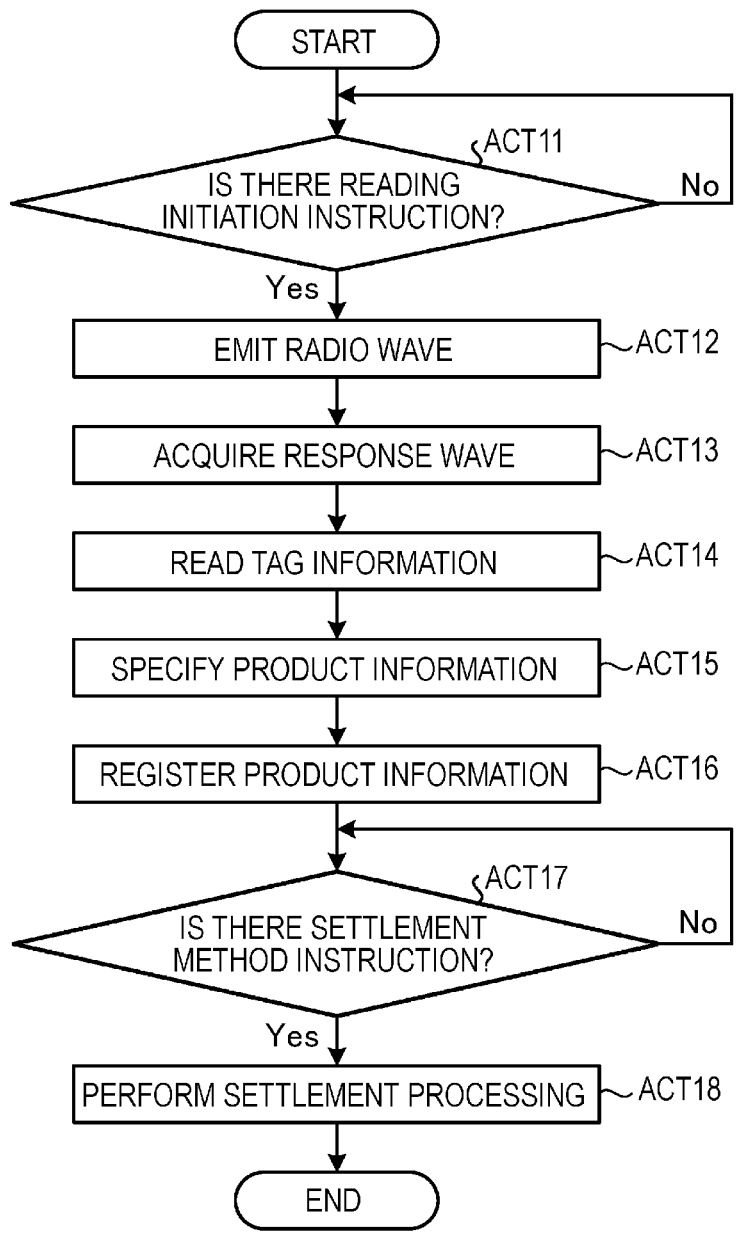
FIG. 9 is a flowchart of an example processing to be performed by a self-checkout device according to an embodiment.

An example flow of processing to be performed by the self-checkout device 101 will be described with reference to FIG. 9. The tag reading unit 18 of the self-checkout device 101 in the present embodiment includes the left side surface antenna 32, the right side surface antenna 33, and the bottom surface antenna 34.

The operation control unit 67 determines whether there is a reading initiation instruction from a customer (Act 11). Act 11 is repeated if it is not determined that there is a reading initiation instruction (Act 11: No).

If it is determined that there is a reading initiation instruction (Act 11: Yes), the antenna control unit 61 causes the left side surface antenna 32, the right side surface antenna 33, and the bottom surface antenna 34 to emit radio waves (Act 12). The radio wave emission timing of each antenna is determined appropriately.

The response wave acquisition unit 62 acquires a response wave from each antenna (Act 13).

The tag information reading unit 63 reads tag information (including a product code) stored in a wireless tag from the response wave acquired by the response wave acquisition unit 62 (Act 14).

The product registration processing unit 64 acquires product information (a product name, a product price, and the like) by collating the product code read by the tag information reading unit 63 with the product master M (Act 15).

Subsequently, the product registration processing unit 64 performs product registration processing for registering the product information in the product registration file R (Act 16).

The operation control unit 67 determines whether a settlement method instruction from a customer is provided (Act 17). Act 17 is repeated if it is not determined that the settlement method instruction is provided (Act 17: No).

If it is determined that the settlement method instruction is provided (Act 17: Yes), the settlement processing unit 65 performs settlement processing by the method instructed by the customer (Act 18). Subsequently, the self-checkout device 101 ends the processing of FIG. 9.

(Other Forms of Back Surface Structure)

Other potential forms of the back surface structure of the self-checkout device 101 will be described with reference to FIG. 10.

Figure 10:
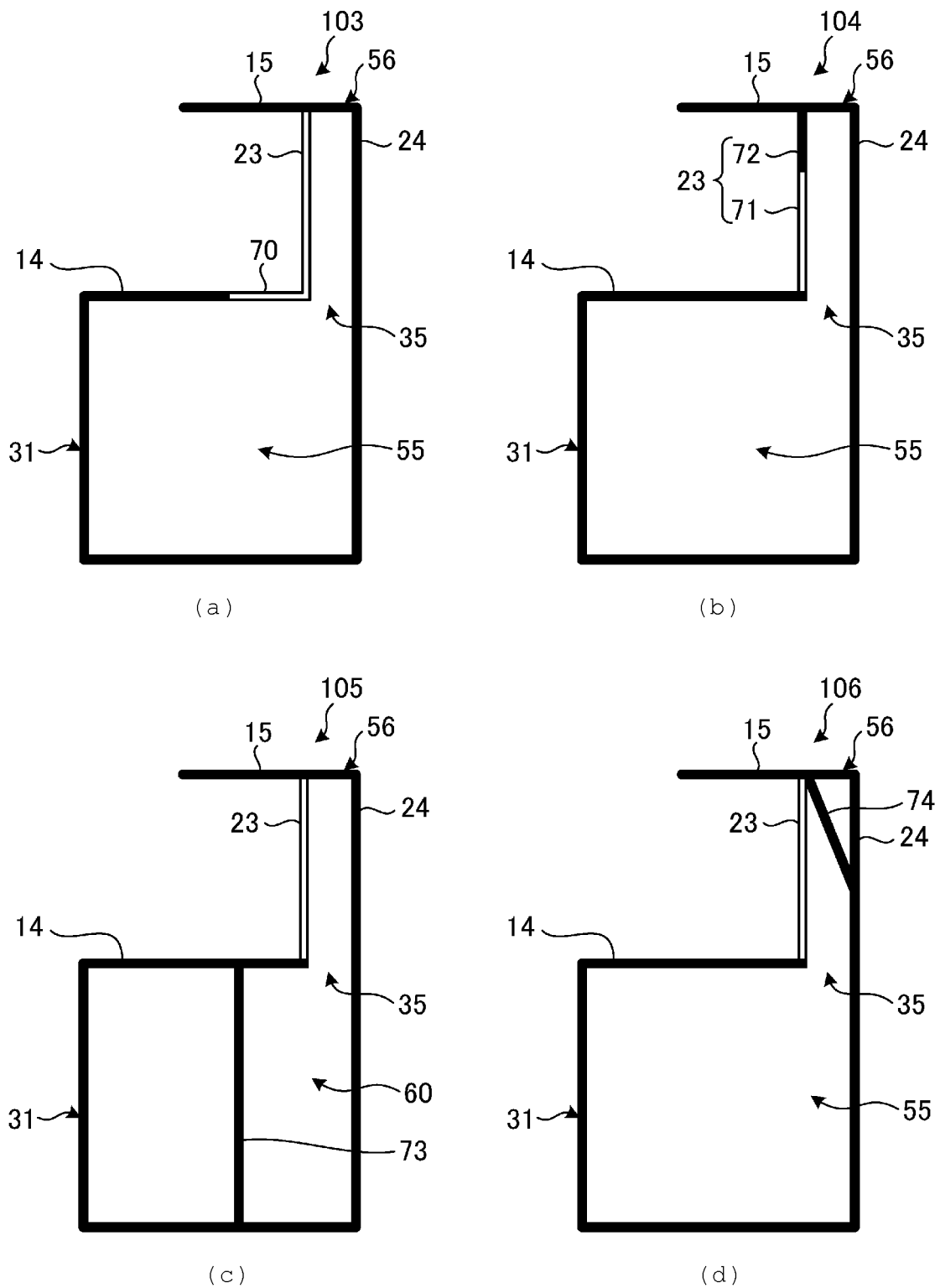
FIG. 10 is a diagram illustrating certain examples of a back surface structure.

A self-checkout device 103 depicted in FIG. 10, part (a) is an example in which a back side bottom surface 70 that is a part of the bottom surface 14 on the back surface side is a radio wave transmission portion made of a material such as wood.

In the self-checkout device 103, a radio wave emitted by at least one of the antennas 32, 33, and 34 reaches and passes through the back side bottom surface 70 and enters the space 55 in the support base 31. The radio wave then repeatedly reflects off the surfaces of the space 55 and gradually attenuates. As a result, the intensity of the radio wave returning toward the front surface open portion 16 from the bottom surface 14 can be reduced.

A self-checkout device 104 depicted in FIG. 10, part (b) is an example in which the inside back surface 23 of the back surface 13 has an inside back surface upper portion 72 that is a radio wave reflection portion formed by a radio wave-reflecting material and an inside back surface lower portion 71 that is a radio wave transmission portion formed by a radio wave-transmitting material.

In the self-checkout device 104, at least a part of the inside back surface 23 is a radio wave transmission portion. As a result, it is possible to reduce the intensity of a radio wave returning toward the front surface open portion 16 from the back surface 13.

A self-checkout device 105 depicted in FIG. 10, part (c) is an example in which a support plate 73 connecting the bottom surface 14 to a bottom surface of the support base 31 is provided in the support base 31. The support plate 73 may be a radio wave reflection portion made of, for example, a metal.

A space 60 less in size than the space 55 is formed in the support base 31 by the support plate 73. In a similar manner to the space 55, the space 60 may still sufficiently attenuate the radio wave that has passed through the back surface lower partition portion 35 from the gap between the inside and outside back surfaces 23 and 24 despite the reduction in size compared to space 55. The support plate 73 supports the bottom surface 14 in the self-checkout device 105, and thus the strength of the housing of the self-checkout device 105 can be improved.

A self-checkout device 106 depicted in FIG. 10, part (d) is an example where an auxiliary back surface 74 is provided to an upper portion of the gap between the inside and outside back surfaces 23 and 24 of the back surface 13. The auxiliary back surface 74 is a radio wave reflection portion capable of reflecting radio waves. It is made of, for example, metal. The auxiliary back surface 74 is installed at an angle to downwardly reflect radio waves incident from the inside back surface 23.

In the self-checkout device 106, part of the radio wave transmitted through the inside back surface 23 hits the auxiliary back surface 74 and is reflected downward. This increases the total amount of radio wave that heads toward the back surface lower partition portion 35 and enters the space 55. Since more radio waves undergo the repetitive reflection and attenuate in the space 55, less radio waves return from the back surface 13 and the radio wave intensity at the front surface open portion 16 can be further reduced.

The back surface structures of the self-checkout devices 101, 102, 103, 104, 105, and 106 may be combined appropriately with one another in whole or in part.

As described above, the self-checkout device 101 (includes the product accommodation portion 20 formed by the bottom surface 14, the left side surface 11, the right side surface 12, and the back surface 13. The product accommodation portion 20 can accommodate therein a product on which a wireless tag has been attached. The self-checkout device 101 also includes the front surface open portion 16 and the upper surface open portion 17 on the front surface side of the product accommodation portion 20 facing the back surface 13 and the upper surface side of the product accommodation portion 20 facing the bottom surface 14. The front surface open portion 16 and the upper surface open portion 17 together form an entrance and an exit for the product to be placed in and taken out of the product accommodation portion 20. The self-checkout device 101 also includes the tag reading unit 18 having an antenna that irradiates the product placed in the product accommodation portion 20 with a radio wave and reads a response signal from a wireless tag. The self-checkout device 101 also includes the left outer side surface 28, the right outer side surface 30, the outside back surface 24, and the outside bottom surface 26 provided on the outer surface of each of the left side surface 11, the right side surface 12, and the back surface 13 and in the bottom portion of the bottom surface 14. Each of the left outer side surface 28, the right outer side surface 30, the outside back surface 24, and the outside bottom surface 26 reflects the radio wave. The self-checkout device 101 also includes the inside back surface 23 provided on the front surface open portion 16 side of the back surface 13 with a gap from the outside back surface 24. The inside back surface 23 transmits the radio wave. Accordingly, radio wave leakage from the front surface open portion 16 of the product accommodation portion 20 can be reduced at a lower cost.

The self-checkout device 101 includes the space 55 surrounded by a radio wave-reflecting material below the bottom surface 14 and the gap between the inside back surface 23 and the outside back surface 24 communicates with the space 55 in the back surface lower partition portion 35. A radio wave incident on the back surface 13 and repeatedly reflected between the inside back surface 23 and the outside back surface 24 passes through the gap between the inside back surface 23 and the outside back surface 24 and ultimately enters the space 55. As a result, it is possible to reduce the intensity of a radio wave that returns toward the front surface open portion 16 from the back surface 13.

In the self-checkout device 101, a part of the upper surface panel 15 of the product accommodation portion 20 on the back surface side can be covered with a radio wave-reflecting material. This can reduce upward radio wave leakage from the product accommodation portion 20.

According to the present embodiment, various display operation devices, such as the display operation panel 22, can be installed in the upper portion of the self-checkout device 101.

In the self-checkout device 101, the antenna of the tag reading unit 18 can be provided between a radio wave-transmitting member installed on a first side facing the product accommodation portion 20 and a radio wave-reflecting member installed on a second side not facing the product accommodation portion 20. Accordingly, a radio wave emitted from the antenna heads toward the product accommodation portion 20 and can be prevented from leaking to the outside from the second side not facing the product accommodation portion 20.

In the self-checkout device 101, the left outer side surface 28, the right outer side surface 30, and the outside back surface 24 can be integrally formed. Accordingly, radio wave leakage from the side and back surfaces of the self-checkout device 101 can be reduced.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reading device, comprising:
    an accommodation region having a bottom surface portion, a first side surface portion, a second side surface portion, and a back surface portion, the accommodation region being configured to accommodate therein a product to which a wireless tag is attached;
    an opening on a front side of the accommodation region and an upper side of the accommodation region, the opening permitting the product to be placed into or taken out of the accommodation region; and
    a tag reading unit including an antenna configured to emit radio waves toward the product in the accommodation region and receive a response signal from the wireless tag of the product therein, wherein
    outside portions of the first side surface portion, the second side surface portion, and the back surface portion are a radio wave reflecting material,
    a bottom portion of the bottom surface portion is a radio wave reflecting material;
    an inside portion of the back surface portion is a radio wave transmitting material, the inside portion and the outside portion of the back surface portion being spaced from each other leaving a gap therebetween; and
    an enclosed space surrounded by a radio wave reflecting material below the bottom surface portion, wherein the gap is connected to the enclosed space.

2. The wireless tag reading device according to claim 1, wherein a part of the upper side of the accommodation region is covered with a radio wave reflecting material.

3. The wireless tag reading device according to claim 1, wherein the antenna is inside one of the bottom surface portion, the first side surface portion, or the second side surface portion.

4. The wireless tag reading device according to claim 3, wherein each of the bottom surface portion, the first side surface portion, and the second side surface portion comprises an interior wall adjacent to the accommodation region and an exterior wall spaced from the interior wall away from the accommodation region, the interior wall being a radio wave transmitting material and the exterior wall being a radio wave reflecting material.

5. The wireless tag reading device according to claim 1, wherein the outside portions of the first side surface portion, the second side surface portion, and the back surface portion are integrally formed.

6. The wireless tag reading device according to claim 1, wherein the radio wave reflecting material is a metal.

7. The wireless tag reading device according to claim 1, further comprising:
    an auxiliary back surface member inside the back surface portion between the inside portion and the outside portion at an oblique angle, the auxiliary back surface member being a radio wave reflecting material.

8. The wireless tag reading device according to claim 1, further comprising:
    a support stand below the bottom surface portion, the support stand enclosing the enclosed space.

9. The wireless tag reading device according to claim 8, wherein the support stand includes a partition wall separating the enclosed space from a front portion of the support stand.

10. A wireless tag reading device, comprising:
    a first sidewall having a double wall structure with a first inner wall adjacent to an accommodation region and a first outer wall spaced from the first inner wall away from the accommodation region;
    a second sidewall facing the first sidewall across the accommodation region and having a double wall structure with a second inner wall adjacent to the accommodation region and a second outer wall spaced from the second inner wall away from the accommodation region;
    a bottom surface portion between the first and second sidewalls at a bottom of the accommodation region, the bottom surface portion having a double wall structure with an upper wall adjacent to the accommodation region and a lower wall spaced away from the accommodation region;
    a back surface portion between the first and second sidewalls at a back of the accommodation region, the back surface portion having a double wall structure with an interior wall adjacent to the accommodation region and an exterior wall spaced away from the accommodation region leaving a gap between the interior wall and the exterior wall, the gap being connected to a radio wave passage region at a bottom of the back surface portion;
    an enclosed space surrounded by a radio wave reflecting material below the bottom surface portion; and
    an antenna structure in at least one of the first sidewall, the second sidewall, or the bottom portion, wherein
    the first inner wall, the second inner wall, the upper wall, and the interior wall are a radio wave transmitting material,
    the first outer wall, the second outer wall, the lower wall, and the exterior wall are a radio wave reflecting material, and
    the gap is connected to the enclosed space via the radio wave passage region.

11. The wireless tag reading device according to claim 10, further comprising:
    a wireless tag reader connected to the antenna structure and configured to cause the antenna structure to emit radio waves towards the accommodation region and to receive a response signal from a wireless tag in the accommodation region.

12. The wireless tag reading device according to claim 10, wherein a space between the first inner wall and the first outer wall is connected to the enclosed space.

13. The wireless tag reading device according to claim 10, wherein the interior wall and the exterior wall are connected at an upper end by a radio wave reflecting member.

14. The wireless tag reading device according to claim 10, further comprising:
    an auxiliary back surface member inside the back surface portion between the interior wall and the exterior wall at an oblique angle, the auxiliary back surface member being a radio wave reflecting material.

15. A self-checkout apparatus, comprising:
a first sidewall having a double wall structure with a first inner wall adjacent to an accommodation region and a first outer wall spaced from the first inner wall away from the accommodation region;
a second sidewall facing the first sidewall across the accommodation region and having a double wall structure with a second inner wall adjacent to the accommodation region and a second outer wall spaced from the second inner wall away from the accommodation region;
a bottom surface portion between the first and second sidewalls at a bottom of the accommodation region, the bottom surface portion having a double wall structure with an upper wall adjacent to the accommodation region and a lower wall spaced away from the accommodation region;
a back surface portion between the first and second sidewalls at a back of the accommodation region, the back surface portion having a double wall structure with an interior wall adjacent to the accommodation region and an exterior wall spaced away from the accommodation region leaving a gap between the interior wall and the exterior wall, the gap being connected to a radio wave passage region at a bottom of the back surface portion;
an antenna structure in at least one of the first sidewall, the second sidewall, or the bottom portion;
an enclosed space surrounded by a radio wave reflecting material below the bottom surface portion; and
a wireless tag reader connected to the antenna structure and configured to cause the antenna structure to emit radio waves towards the accommodation region and to receive a response signal from a wireless tag in the accommodation region, wherein
the gap is connected to the enclosed space,
the interior wall of the back surface portion is a radio wave transmitting material, and
the exterior wall of the back surface portion is a radio wave reflecting material.

16. The self-checkout apparatus according to claim 15, further comprising:
an auxiliary back surface member inside the back surface portion between the interior wall and the exterior wall at an oblique angle, the auxiliary back surface member being a radio wave reflecting material.

17. The self-checkout apparatus according to claim 15, further comprising:
a display screen mounted on the upper ends of the first and second sidewalls.

18. The self-checkout apparatus according to claim 15, further comprising:
a processor configured to receive a product code acquired from the wireless tag via the wireless tag reader, acquire product information associated with the acquired product code, and register the product information in a sales transaction.

* * * * *